United States Patent
Fujisawa et al.

(10) Patent No.: US 11,079,072 B2
(45) Date of Patent: Aug. 3, 2021

(54) GAS SUPPLY SYSTEM, VEHICLE, AND HYDROGEN SUPPLY FACILITY

(71) Applicant: KOBE STEEL, LTD., Hyogo (JP)

(72) Inventors: Akitoshi Fujisawa, Hyogo (JP); Yukinobu Taniguchi, Hyogo (JP); Kento Ogata, Hyogo (JP); Hiroo Hangai, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/346,020

(22) PCT Filed: Sep. 14, 2017

(86) PCT No.: PCT/JP2017/033263
§ 371 (c)(1),
(2) Date: Apr. 29, 2019

(87) PCT Pub. No.: WO2018/083892
PCT Pub. Date: May 11, 2018

(65) Prior Publication Data
US 2019/0267653 A1 Aug. 29, 2019

(30) Foreign Application Priority Data
Nov. 7, 2016 (JP) .............................. JP2016-217580

(51) Int. Cl.
*F17C 11/00* (2006.01)
*F17C 5/06* (2006.01)
(Continued)

(52) U.S. Cl.
CPC .............. *F17C 11/005* (2013.01); *F17C 5/06* (2013.01); *F17C 11/00* (2013.01); *F17C 13/00* (2013.01);
(Continued)

(58) Field of Classification Search
CPC .... F17C 2227/0337–0365; F17C 5/007; F17C 2221/012; F17C 5/06; F17C 11/005; F17C 2227/0302–0334; F25B 9/004
See application file for complete search history.

(56) References Cited

U.S. PATENT DOCUMENTS 6,202,710 B1 * 3/2001 Dill .................... F17C 5/007
141/94
7,938,150 B2 * 5/2011 Handa .................. F17C 5/007
141/82
(Continued)

FOREIGN PATENT DOCUMENTS

JP 2010-169180 A 8/2010

OTHER PUBLICATIONS

Written Opinion issued in PCT/JP2017/033263; dated Oct. 17, 2017.

*Primary Examiner* — Andrew D Stclair
(74) *Attorney, Agent, or Firm* — Studebaker & Brackett PC

(57) ABSTRACT

Provided is a gas supply system for supplying hydrogen to a vehicle, the vehicle including: a tank loaded with a hydrogen storage alloy, storing and releasing hydrogen; and a thermal medium distribution unit attached to the tank and configured such that a thermal medium for heating or cooling the hydrogen storage alloy is distributable from outside, includes: a reservoir reserving hydrogen at a pressure of 0.2 MPa or greater and less than 3.0 MPa; a hydrogen flow path connectable to the vehicle for supplying hydrogen from the reservoir to the tank; a cooling medium reservoir reserving the thermal medium for cooling; and a thermal medium flow path connectable to the vehicle for distributing the thermal medium to the thermal medium distribution unit in the vehicle, in which the hydrogen flow path and the
(Continued)

thermal medium flow path are combined at least at an end portion connectable to the vehicle.

6 Claims, 2 Drawing Sheets

(51) Int. Cl.
*F17C 13/00* (2006.01)
*F17C 13/02* (2006.01)
*H01M 8/04* (2016.01)
*H01M 8/0606* (2016.01)

(52) U.S. Cl.
CPC .......... *F17C 13/002* (2013.01); *F17C 13/025* (2013.01); *H01M 8/04* (2013.01); *H01M 8/0606* (2013.01); *Y02E 60/32* (2013.01)

(56) References Cited

U.S. PATENT DOCUMENTS

| | | | |
|---|---|---|---|
| 2002/0100369 A1* | 8/2002 | Kuriiwa | C01B 3/0005 96/146 |
| 2003/0150510 A1 | 8/2003 | Cohen et al. | |
| 2007/0144183 A1* | 6/2007 | Sakajo | B60H 1/14 62/7 |
| 2007/0257043 A1* | 11/2007 | Kanoya | F17C 13/026 220/581 |
| 2008/0250804 A1* | 10/2008 | Kubo | F17C 13/025 62/241 |
| 2012/0216915 A1* | 8/2012 | Takata | F28D 7/14 141/82 |
| 2014/0205474 A1 | 7/2014 | Nakamura et al. | |
| 2017/0328519 A1 | 11/2017 | Okuno et al. | |

\* cited by examiner

GAS SUPPLY SYSTEM, VEHICLE, AND HYDROGEN SUPPLY FACILITY

TECHNICAL FIELD

The present invention relates to a gas supply system, a vehicle and a hydrogen supply facility.

BACKGROUND ART

In recent years, a hydrogen station has been developed having a hydrogen supply facility for filling a tank of a fuel cell automobile with hydrogen. As a hydrogen fill-up process for fuel cell automobiles, a process of filling with hydrogen at a high pressure has been adopted and put into practical use. For the hydrogen fill-up of fuel cell automobiles, a process of filling an on-board tank with high-pressure hydrogen cooled in the hydrogen supply facility has been employed, in order to suppress a rise in temperature of the on-board tank (Patent Document 1). In addition, a facility in which a compressor, a refrigerator, etc. are packaged has been developed, in order to achieve the aforementioned process in the hydrogen station (Patent Document 2).

PRIOR ART DOCUMENTS

Patent Documents

Patent Document 1: Japanese Patent No. 4071648
Patent Document 2: Japanese Unexamined Patent Application, Publication No. 2016-90043

SUMMARY OF THE INVENTION

Problems to be Solved by the Invention

For the hydrogen supply facility in the hydrogen station, hydrogen filing-up of a fuel tank of the vehicle in a short period of time is demanded. In order to increase the hydrogen filling speed, it may be contemplated to increase the supply pressure of hydrogen. However, a facility that handles high-pressure gas may become larger or more complex due to a need for a pressure-resistant structure, etc. In order to achieve the hydrogen filing-up of the fuel tank of the vehicle in a short period of time without increasing the supply pressure of hydrogen, novel improvements are required for both the hydrogen supply system and the vehicle.

The present invention was made in view of the foregoing circumstances, and an object of the present invention is to provide a gas supply system, a vehicle, and a hydrogen supply facility that enable suppression of complexity or an increase in size, and enable supply of hydrogen at a high supply speed.

Means for Solving the Problems

According to an aspect of the invention made for solving the aforementioned problems, a gas supply system for use in supplying hydrogen to a vehicle, the vehicle including: a tank that is loaded with a hydrogen storage alloy, stores and releases hydrogen; and a thermal medium distribution unit that is attached to the tank and is configured such that a thermal medium for heating or cooling the hydrogen storage alloy is distributable from an external space, includes: a reservoir that reserves hydrogen at a pressure of greater than or equal to 0.2 MPa and less than 3.0 MPa; a hydrogen flow path that is connectable to the vehicle for supplying hydrogen from the reservoir to the tank in the vehicle at a pressure of greater than or equal to 0.2 MPa and less than 3.0 MPa; a cooling medium reservoir that reserves the thermal medium for cooling; and a thermal medium flow path that is connectable to the vehicle for distributing the thermal medium to the thermal medium distribution unit in the vehicle, in which the hydrogen flow path and the thermal medium flow path are combined at least at an end portion connectable to the vehicle.

In the case of supplying hydrogen in a common procedure of using high-pressure hydrogen, hydrogen is supplied to the vehicle at a high pressure of about several tens of MPa. On the other hand, the gas supply system of the aspect of the invention supplies hydrogen at a pressure of greater than or equal to 0.2 MPa and less than 3.0 MPa, to the vehicle having a tank loaded with a hydrogen storage alloy. The gas supply system thus can reduce the need for using a pressure-resistant member and a hydrogen embrittlement resistant member, and enables suppression of the complexity or the increase in size. In addition, the gas supply system is capable of supplying a thermal medium for cooling together with hydrogen to the vehicle, and consequently capable of supplying hydrogen to the tank while cooling the hydrogen storage alloy with the thermal medium for cooling. Since a reaction of absorbing hydrogen in the hydrogen storage alloy is an exothermic reaction, cooling the hydrogen storage alloy enables the hydrogen absorption reaction to be promoted. In other words, the gas supply system is capable of supplying hydrogen to the vehicle at the high supply speed, while cooling the hydrogen storage alloy in the vehicle. Furthermore, due to the structure in which the hydrogen flow path for supplying hydrogen to the tank in the vehicle is combined, at least at an end portion connectable to the vehicle, with the thermal medium flow path for distributing the thermal medium for cooling to the thermal medium distribution unit in the vehicle, easy connection of the hydrogen flow path and the thermal medium flow path with the vehicle is enabled by the gas supply system.

It is preferred that the gas supply system further includes a coupler that is connectable to the vehicle in a detachable manner, in which the hydrogen flow path and the thermal medium flow path are combined in the coupler. When one such a coupler is connectable to the vehicle, easy connection of the hydrogen flow path and the thermal medium flow path with the vehicle is enabled.

It is preferred that, in the gas supply system, the thermal medium for cooling at a temperature of greater than or equal to −40° C. and less than or equal to 0° C. is distributed in the thermal medium distribution unit in the vehicle. Due to the hydrogen storage alloy in the vehicle being cooled to an appropriate temperature range by the thermal medium for cooling, the hydrogen absorption reaction of the hydrogen storage alloy may be promoted, whereby the gas supply system can supply hydrogen to the vehicle at the high supply speed.

It is preferred that the gas supply system further includes a thermal medium delivery device that delivers the thermal medium for heating to the thermal medium distribution unit in the vehicle. Immediately after hydrogen filling, the hydrogen storage alloy in the vehicle is cooled, and consequently hydrogen releaseability of the hydrogen storage alloy is lowered. In this respect, due to the thermal medium delivery device delivering the thermal medium for heating to the thermal medium distribution unit in the vehicle, the thermal medium distribution unit is rapidly heated, whereby release of hydrogen from the hydrogen storage alloy is enabled to be promoted.

According to another aspect of the invention made for solving the aforementioned problems, a vehicle includes: a tank that is loaded with a hydrogen storage alloy, stores and releases hydrogen; and a thermal medium distribution unit that is attached to the tank and is configured such that a thermal medium for heating or cooling the hydrogen storage alloy is distributable from an external space, in which an equilibrium hydrogen pressure of the hydrogen storage alloy at −15° C. is greater than or equal to 0.05 MPa and less than 0.5 MPa.

Due to the vehicle including the thermal medium distribution unit configured such that the thermal medium for heating or cooling the hydrogen storage alloy is distributable from the external space, even if the vehicle is not equipped with a cooling device, the hydrogen storage alloy is cooled by the thermal medium for cooling distributed from the external space, whereby the hydrogen absorption reaction of the hydrogen storage alloy is promoted. In other words, the vehicle can be supplied with hydrogen at the high supply speed, owing to the hydrogen absorption reaction of the hydrogen storage alloy being promoted. In addition, the hydrogen storage alloy with which the tank in the vehicle is loaded has a low equilibrium hydrogen pressure at −15° C. Supply of hydrogen to the vehicle at a low pressure is thus enabled, whereby the complexity or the increase in size of the gas supply system can be suppressed that supplies hydrogen to the vehicle.

It is preferred that the vehicle further includes a cargo handling device. In regard to the vehicle with a cargo handling device, e.g., hydrogen-driven cargo vehicles such as a fuel cell forklift, design freedom of a vehicle body is different from that of the fuel cell automobile, and consequently it is difficult to provide a cooling device in the vehicle due to, for example, a need for installing the cargo handling device. On the other hand, the vehicle obviates the need for providing a cooling device therein for cooling the hydrogen storage alloy, since the hydrogen storage alloy is cooled by the thermal medium for cooling distributed from the external space, whereby the hydrogen absorption reaction of the hydrogen storage alloy is promoted.

According to yet another aspect of the invention made for solving the aforementioned problems, a hydrogen supply facility includes the gas supply system and supplies hydrogen to the vehicle.

The hydrogen supply facility is capable of filling the tank of the vehicle with hydrogen at the high supply speed, while cooling the hydrogen storage alloy in the vehicle. In addition, due to not employing high-pressure hydrogen gas, the hydrogen supply facility can reduce the need for using a pressure-resistant member and a hydrogen embrittlement resistant member, and enables suppression of the complexity or the increase in size.

The "equilibrium hydrogen pressure" as referred to herein means a pressure at which a hydrogen concentration (H/M) is 0.5, on the pressure-composition isotherm (PCT) curve of the hydrogen storage alloy obtained pursuant to JIS-H7201 (2007).

Effects of the Invention

The gas supply system, the vehicle, and the hydrogen supply facility according to the aspects of the present invention enable suppression of the complexity or the increase in size, and supply of hydrogen at the high supply speed.

DESCRIPTION OF EMBODIMENTS

Embodiments of the present invention will be explained in detail with appropriate reference to the drawings.

Hydrogen Supply Facility

Figure 1:
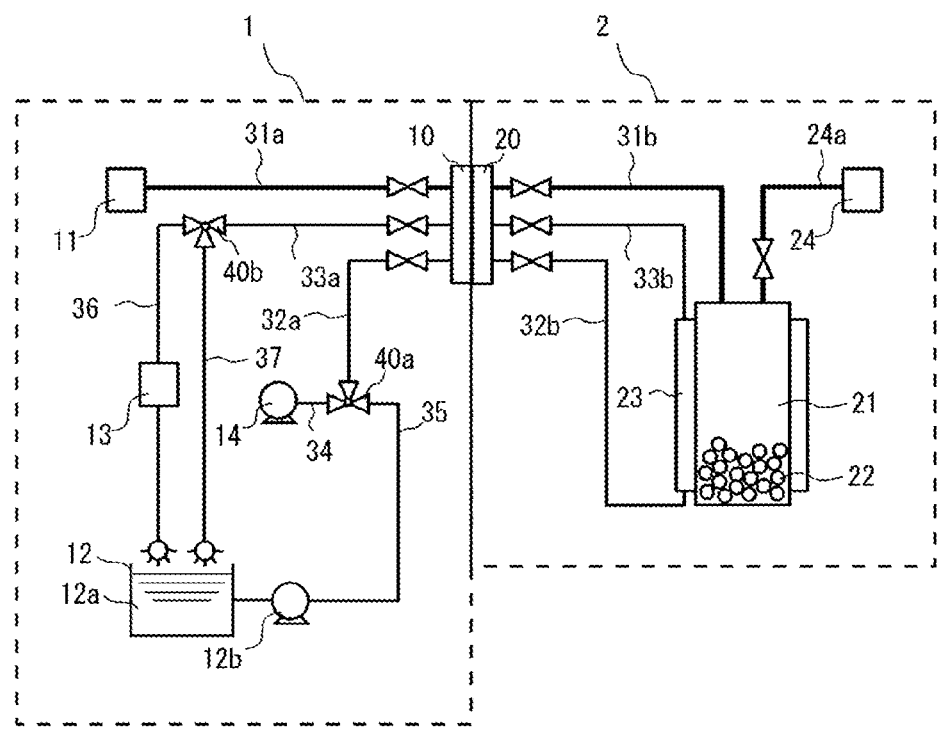
FIG. 1 is a schematic configuration diagram schematically showing a hydrogen supply facility and a vehicle according to one embodiment of the present invention.

The hydrogen supply facility according to one embodiment of the present invention shown in FIG. 1 includes a gas supply system 1 and is configured to supply hydrogen to a vehicle 2. In regard to the gas supply system 1 and the vehicle 2, a connection portion 10 of the gas supply system 1 is connected to a connection portion 20 of the vehicle 20, thereby enabling supply of hydrogen and distribution of the thermal medium. The supply of hydrogen and the distribution of the thermal medium are described later in detail.

Gas Supply System

The gas supply system 1 includes: a reservoir 11 that reserves hydrogen at a pressure of greater than or equal to 0.2 MPa and less than 3.0 MPa; a hydrogen flow path 31a that is connectable to the vehicle 2 for supplying hydrogen from the reservoir 11 to a tank 21 in the vehicle 2 at a pressure of greater than or equal to 0.2 MPa and less than 3.0 MPa; a cooling medium reservoir 12 that reserves the thermal medium for cooling 12a; and thermal medium flow paths 32a and 35 that are connectable to the vehicle 2 for distributing the thermal medium to the thermal medium distribution unit 23 in the vehicle 2. The gas supply system 1 further includes: a heat exchanger 13 that cools the thermal medium for cooling 12a passing through a thermal medium flow path 36, and a thermal medium delivery device 14 that enables delivery of the thermal medium for heating to the thermal medium distribution unit 23 in the vehicle 2.

Reservoir

The reservoir 11 is a tank for reserving hydrogen at a pressure of greater than or equal to 0.2 MPa and less than 3.0 MPa. Owing to reserving hydrogen at the pressure of greater than or equal to 0.2 MPa and less than 3.0 MPa, a tank formed without using a pressure resistant member or a hydrogen embrittlement resistant material may be employed as the reservoir 11. A material for the tank is exemplified by a stainless alloy, an aluminum alloy, and the like. To the reservoir 11, a flow path (not illustrated) that supplies hydrogen to the reservoir 11, and a hydrogen flow path 31a for delivery of hydrogen in the reservoir 11 toward the vehicle 2 are connected. An openable and closable valve is provided in the course of the hydrogen flow path 31a. An end of the hydrogen flow path 31a not connected to the reservoir 11 is communicated to the connection portion 10.

The upper limit of the pressure of hydrogen reserved in the reservoir 11 and the upper limit of the pressure of hydrogen supplied from the reservoir 11 to the tank 21 in the vehicle 2 are preferably less than 3.0 MPa and more preferably less than 1.0 MPa. Meanwhile, the lower limit of the pressure of hydrogen for both is preferably greater than or equal to 0.2 MPa and more preferably greater than or equal to 0.4 MPa. When such pressure of hydrogen is greater than or equal to the upper limit, it may be necessary to use the pressure resistant member or the hydrogen embrittlement resistant member in order to provide pressure resistance. To the contrary, when such pressure of hydrogen is less than the lower limit, the supply speed of hydrogen to the vehicle 2 may be reduced and a time period required for supplying hydrogen may be too long. In particular, a facility reserving or handling gas at a pressure of greater than 1.0 MPa is currently subject to the regulation of the High Pressure Gas Safety Act in Japan, and therefore operation thereof is constrained by the Act. In the case of the pressure of hydrogen reserved in the reservoir 11 being less than 1.0 MPa, the regulation of the High Pressure Gas Safety Act does not apply thereto, and cost may be reduced.

Cooling Medium Reservoir

The cooling medium reservoir 12 is a tank that reserves the thermal medium for cooling 12a in a cooled state. The cooling medium reservoir 12 is not particularly limited as long as it is a tank that retains the thermal medium for cooling 12a in a cooled state, and may be, for example, a tank having a thermal insulation structure provided with a cooling device that cools the thermal medium for cooling 12a. The thermal medium for cooling 12a is not particularly limited and may be, for example, oil, an antifreeze liquid, air, and the like. Preferably, a fluid that is high in thermal capacity, superior in thermal transport performance and low in viscosity, and requires low feeding power is used. Such a fluid is exemplified by Cold Brine FP-40R available from Showa Industries Co., Ltd., and the like. The thermal medium flow path 35 that delivers the thermal medium for cooling 12a toward the vehicle 2 is connected to a downstream end of the cooling medium reservoir 12, while the thermal medium flow paths 36 and 37 that receive the thermal medium for cooling 12a returned from the vehicle 2 are connected to an upstream end of the cooling medium reservoir 12.

A pump 12b that delivers the thermal medium for cooling 12a from the cooling medium reservoir 12 toward the vehicle 2 is connected to the course of the thermal medium flow path 35. The heat exchanger 13 is provided in the course of the thermal medium flow path 36 such that the returned thermal medium for cooling 12a is cooled. The heat exchanger 13 is not particularly limited, and may be a plate heat exchanger for cooling. A cooling medium for cooling the thermal medium for cooling 12a in the heat exchanger 13 is not particularly limited, and may be, for example, a fluorine cooling medium R-404A.

The upper limit of the temperature of the thermal medium for cooling 12a when being delivered toward the vehicle 2 is preferably 0° C. and more preferably −10° C. Meanwhile, the lower limit of the temperature is preferably −40° C. and more preferably −20° C. When the temperature of the thermal medium for cooling 12a is greater than the upper limit, cooling of the hydrogen storage alloy 22 in the vehicle 2 to a low temperature may fail, and it may be thus required to employ the hydrogen storage alloy 22 low in equilibrium hydrogen pressure. In this case, in order to increase the equilibrium hydrogen pressure upon release of hydrogen, a heating device may be required for heating the hydrogen storage alloy 22. To the contrary, when the temperature of the thermal medium for cooling 12a is less than the lower limit, an unduly large amount of energy may be required for cooling the thermal medium for cooling 12a. In the case in which the temperature of the thermal medium for cooling 12a is greater than or equal to −40° C. and less than or equal to 0° C., the gas supply system 1 will be capable of distributing the thermal medium for cooling 12a at a temperature of greater than or equal to −40° C. and less than or equal to 0° C. in the thermal medium distribution unit 23 in the vehicle 2.

Thermal Medium Delivery Device

The thermal medium delivery device 14 enables delivery of the thermal medium for heating to the thermal medium flow path 34. The thermal medium for heating may be, for example, air, and the thermal medium delivery device 14 may be, for example, an electric air pump, although not particularly limited thereto.

Thermal Medium Flow Path

The gas supply system 1 is provided with the thermal medium flow path 32a, the thermal medium flow path 33a, the thermal medium flow path 34, the thermal medium flow path 35, the thermal medium flow path 36, and the thermal medium flow path 37. The gas supply system 1 is further provided with: a switching valve 40a that allows selective connection between the thermal medium flow path 32a and the thermal medium flow path 34, or between the thermal medium flow path 32a and the thermal medium flow path 35; and a switching valve 40b that allows selective connection between the thermal medium flow path 33a and the thermal medium flow path 36, or between the thermal medium flow path 33a and the thermal medium flow path 37. An openable and closable valve is provided in the course of each of the thermal medium flow path 32a and the thermal medium flow path 33a. End portions of the thermal medium flow path 32a and the thermal medium flow path 33a on the vehicle 2 side are communicated to the connection portion 10 (described later).

Connection Portion

The hydrogen flow path 31a, the thermal medium flow path 32a and the thermal medium flow path 33a are combined at least at the end portion connectable to the vehicle 2. Specifically, the connection portion 10 is connected to end sides of the hydrogen flow path 31a, thermal medium flow path 32a and thermal medium flow path 33a, whereby these three flow paths are bundled and combined in the connection portion 10. More specifically, the gas supply system 1 is provided with a dispenser having: a hose extending from the dispenser; a filling nozzle; and a coupler that serves as the connection portion 10. Furthermore, the hydrogen flow path 31a is connected to the coupler via the dispenser, and the thermal medium flow path 32a and the thermal medium flow path 33a are connected to the coupler, whereby the hydrogen flow path 31a, the thermal medium flow path 32a and the thermal medium flow path 33a are bundled in the coupler. In other words, the gas supply system 1 is provided with the coupler connectable to the vehicle 2 in a detachable manner, with the hydrogen flow path 31a, the thermal medium flow path 32a and the thermal medium flow path 33a being combined in the coupler.

The connection portion 10 is configured to be connectable to the connection portion 20 of the vehicle 2 (described below) in a detachable manner. In addition, the connection portion 10 is configured such that, when the connection portion 10 is connected to the connection portion 20 of the vehicle 2, the hydrogen flow path 31a, the thermal medium flow path 32a and the thermal medium flow path 33a are respectively connected to a hydrogen flow path 31b, a thermal medium flow path 32b and a thermal medium flow path 33b of the vehicle 2.

Vehicle

The vehicle 2 includes: the tank 21 that is loaded with the hydrogen storage alloy 22, stores and releases hydrogen; and the thermal medium distribution unit 23 that is attached to the tank 21 and is configured such that the thermal medium for heating or cooling the hydrogen storage alloy 22 is distributable from an external space. The vehicle 2 further includes a driving device 24 that is driven by hydrogen, with which the tank 21 is filled, as a fuel. The vehicle 2 may be either a fuel cell automobile or a fuel cell cargo vehicle having the cargo handling device. In the case of the vehicle 2 being the fuel cell cargo vehicle, the vehicle 2 may be, for example, a vehicle-type construction machine such as a forklift, a crane car, an excavator, and the like.

Tank

Than tank 21 includes a tank main body, which is loaded with the hydrogen storage alloy 22. To the tank 21, a flow path 24a that delivers hydrogen to the driving device 24, and one end of the hydrogen flow path 31b for introducing hydrogen delivered from the gas supply system 1 to the tank 21 are connected. An openable and closable valve is provided in the course of each of the flow path 24a and the hydrogen flow path 31b. The other end of the hydrogen flow path 31b not connected to the tank 21 is connected to the connection portion 20.

Hydrogen Storage Alloy

Figure 2:
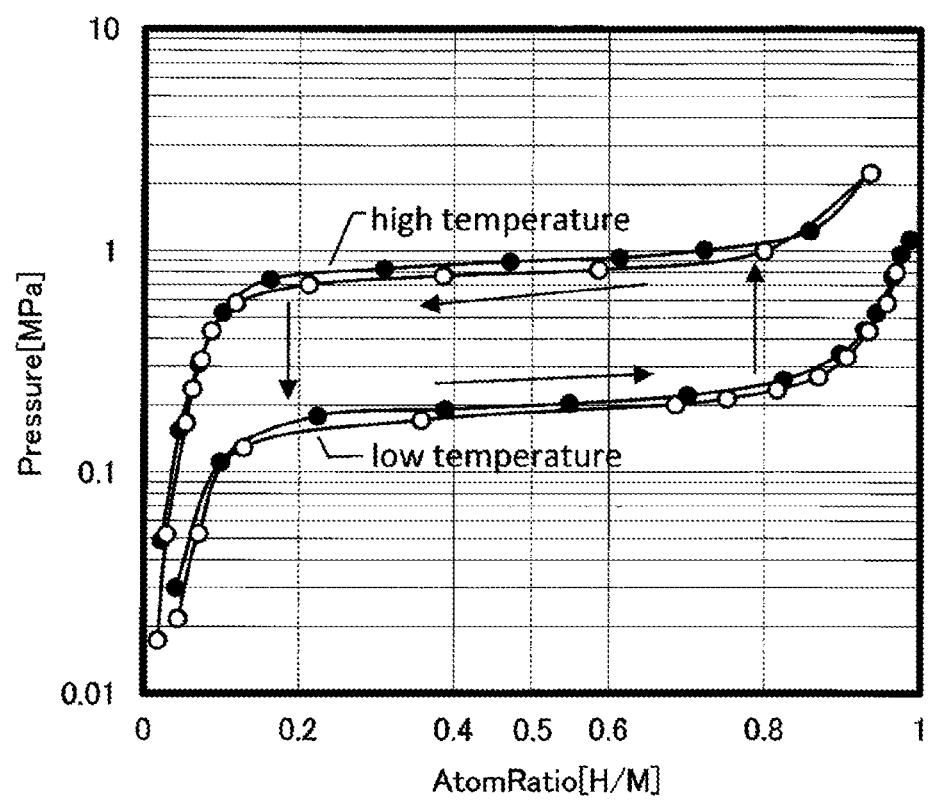
FIG. 2 is a schematic view for explanation of a pressure-composition isotherm curve of a $LaNi_5$ hydrogen storage alloy, in which: an ordinate represents an equilibrium hydrogen pressure; an abscissa represents a hydrogen concentration; filled circles indicate values during hydrogen storage; and open circles indicate values during hydrogen release.

The hydrogen storage alloy 22 is capable of absorbing, storing and releasing hydrogen through control of pressure or temperature. The vehicle 2 according to the present embodiment employs a $LaNi_5$ hydrogen storage alloy as the hydrogen storage alloy 22. As shown in FIG. 2, the $LaNi_5$ hydrogen storage alloy exhibits a substantially constant equilibrium hydrogen pressure (MPa) within a range of hydrogen concentration (H/M) from 0.2 (non-filled state) to 0.8 (fully filled state). In addition, the hydrogen storage alloy has such a property that the equilibrium hydrogen pressure is lower at a low temperature than at a high temperature. Furthermore, the reaction of absorbing hydrogen in the hydrogen storage alloy is an exothermic reaction, while a reaction of releasing hydrogen from the hydrogen storage alloy is an endothermal reaction. In other words, it is required that the hydrogen storage alloy 22 is at a low temperature upon absorption of hydrogen, and at a high temperature upon release of hydrogen.

In order to increase the hydrogen absorption speed of the hydrogen storage alloy upon absorption of hydrogen, it is preferred to employ a $LaNi_5$ hydrogen storage alloy that has a low in equilibrium hydrogen pressure such that a pressure difference can be increased. On the other hand, in order to release hydrogen from the hydrogen storage alloy without heating or with a small amount of heating, it is preferred to employ a $LaNi_5$ hydrogen storage alloy that exhibits sufficient equilibrium hydrogen pressure at the normal temperature. The hydrogen storage alloy 22 exhibiting such properties is not particularly limited, and may be, for example, a LaCeNiCo quaternary alloy such as $La_{0.7}Ce_{0.3}Ni_{4.7}Co_{0.6}$.

The upper limit of the equilibrium hydrogen pressure of the hydrogen storage alloy 22 at $-15°$ C. is preferably 0.5 MPa, more preferably 0.4 MPa, and still more preferably 0.3 MPa. Meanwhile, the lower limit of the equilibrium hydrogen pressure of the hydrogen storage alloy 22 at $-15°$ C. is preferably 0.05 MPa, more preferably 0.06 MPa, and still more preferably 0.07 MPa. When the equilibrium hydrogen pressure of the hydrogen storage alloy 22 at $-15°$ C. is greater than the upper limit, the cooled hydrogen storage alloy 22 may not be capable of absorbing hydrogen at a sufficient absorption speed. To the contrary, when the equilibrium hydrogen pressure of the hydrogen storage alloy 22 at $-15°$ C. is less than the lower limit, a time period needed for releasing hydrogen from the hydrogen storage alloy 22 after the hydrogen storage may be prolonged, whereby hydrogen supply to the fuel cell may be insufficient after hydrogen filling.

The upper limit of the equilibrium hydrogen pressure of the hydrogen storage alloy 22 at 20° C. is preferably 3 MPa, more preferably 2.5 MPa, and still more preferably 2 MPa. Meanwhile, the lower limit of the equilibrium hydrogen pressure of the hydrogen storage alloy 22 at 20° C. is preferably 0.2 MPa, more preferably 0.3 MPa, and still more preferably 0.4 MPa. When the equilibrium hydrogen pressure of the hydrogen storage alloy 22 at 20° C. is greater than the upper limit, the pressure inside the tank 21 may be so high that suppression of the complexity or the increase in size of the apparatus may fail. To the contrary, when the equilibrium hydrogen pressure of the hydrogen storage alloy 22 at 20° C. is less than the lower limit, a release speed of hydrogen from the hydrogen storage alloy 22 may be insufficient.

Thermal Medium Distribution Unit

The thermal medium distribution unit 23 is attached to the tank 21. The thermal medium flow path 32b that receives the thermal medium delivered from the gas supply system 1 is connected to an upstream end of the thermal medium distribution unit 23, while the thermal medium flow path 33b that delivers the thermal medium back to the gas supply system 1 is connected to a downstream end of the thermal medium distribution unit 23. An openable and closable valve is provided in the course of each of the thermal medium flow path 32b and the thermal medium flow path 33b. The end portion of the thermal medium flow path 32b and the end portion of the thermal medium flow path 33b are connected to the connection portion 20. During absorption of hydrogen, the thermal medium for cooling 12a is distributed in the thermal medium distribution unit 23, whereby heat is removed from the hydrogen storage alloy 22 in the tank 21.

Connection Portion

The hydrogen flow path 31b, the thermal medium flow path 32b and the thermal medium flow path 33b are combined at least at the end portions connectable to the gas supply system 1. Specifically, the connection portion 20 is connected to end sides of the hydrogen flow path 31b, thermal medium flow path 32b and thermal medium flow path 33b, whereby these three flow paths are bundled and combined in the connection portion 20. The connection portion 20 is configured to be connectable to the coupler that serves as the connection portion 10 of the gas supply system 1 in a detachable manner.

Advantages

The gas supply system 1 is capable of supplying hydrogen to the tank 21 while cooling the hydrogen storage alloy 22 with the thermal medium for cooling 12a, due to having the hydrogen flow path 31a that supplies hydrogen to the tank 21 in the vehicle 2, and the thermal medium flow paths 32a, 33a that distribute the thermal medium for cooling to the thermal medium distribution unit in the vehicle. In other words, the gas supply system 1 is capable of supplying hydrogen to the vehicle 2 at the high supply speed, while cooling the hydrogen storage alloy 22 in the vehicle 2.

In addition, the gas supply system 1 can reduce the need for using a pressure-resistant member and a hydrogen embrittlement resistant member, and enable suppression of the complexity or the increase in size, due to: reserving hydrogen at a pressure of greater than or equal to 0.2 MPa and less than 3.0 MPa; and supplying hydrogen to the vehicle 2 at a pressure of greater than or equal to 0.2 MPa and less than 3.0 MPa.

Furthermore, the gas supply system 1 enables easy connection of: the hydrogen flow path 31*a* and the thermal medium flow paths 32*a*, 33*a*; to the hydrogen flow path 31*b* and the thermal medium flow paths 32*b*, 33*b* of the vehicle 2 respectively, due to the hydrogen flow path 31*a* and the thermal medium flow paths 32*a*, 33*a* being combined in the connection portion 10.

The vehicle 2 enables filling of the tank 21 with hydrogen along with cooling of the hydrogen storage alloy 22 with the thermal medium for cooling 12*a* distributed from the external space, since the vehicle 2 has the thermal medium distribution unit 23 configured such that the thermal medium for heating or cooling the hydrogen storage alloy 22 is distributable. Particularly due to the equilibrium hydrogen pressure of the hydrogen storage alloy 22 at −15° C. being greater than or equal to 0.05 MPa and less than 0.5 MPa, the hydrogen storage alloy 22 is capable of absorbing hydrogen at a high absorption speed. In addition, due to the equilibrium hydrogen pressure of the hydrogen storage alloy 22 at 20° C. being greater than or equal to 0.2 MPa and less than or equal to 3 MPa, the hydrogen storage alloy 22 is capable of releasing hydrogen without heating or with a small amount of heating. In other words, the vehicle 2 requires neither a cooling device for cooling the hydrogen storage alloy 22, nor a heating device for heating the hydrogen storage alloy 22 to a high temperature, installed in the vehicle 2 itself.

Hydrogen Supply Procedure by Hydrogen Supply Facility

A hydrogen supply procedure by the hydrogen supply facility provided with the gas supply system 1 will be described in detail below.

First, the connection portion 10 of the gas supply system 1 is connected to the connection portion 20 of the vehicle 2. In this process, the switching valve 40*a* connects the thermal medium flow path 32*a* with the thermal medium flow path 35, while the switching valve 40*b* connects the thermal medium flow path 33*a* with the thermal medium flow path 36. In addition, the valves in the thermal medium flow paths are opened.

Subsequently, the pump 12*b* is driven to deliver the thermal medium for cooling 12*a* from the cooling medium reservoir 12 to the thermal medium flow path 35. The thermal medium for cooling 12*a* delivered to the thermal medium flow path 35 reaches the thermal medium distribution unit 23 via the thermal medium flow path 32*a* and the thermal medium flow path 32*b*. The thermal medium for cooling 12*a* conducts heat exchange with the hydrogen storage alloy 22 in the thermal medium distribution unit 23, to thereby remove heat from the hydrogen storage alloy 22 in the tank 21. The thermal medium for cooling 12*a* discharged from the thermal medium distribution unit 23 is delivered back to the cooling medium reservoir 12 via the thermal medium flow path 33*b*, the thermal medium flow path 33*a* and the thermal medium flow path 36. By means of the heat exchanger 13 attached to the thermal medium flow path 36 such that the thermal medium for cooling 12*a* being delivered back is cooled, the thermal medium for cooling 12*a* delivered back to the cooling medium reservoir 12 is in a cooled state again. Owing to the thermal medium 12*a* thus circulating in the gas supply system 1 and in the vehicle 2, the hydrogen storage alloy 22 in the vehicle 2 is cooled.

In addition, concurrently with the start of cooling of the hydrogen storage alloy 22, or after the start of cooling of the hydrogen storage alloy 22, the valve provided to the hydrogen flow path is opened to deliver hydrogen from the reservoir 11 to the hydrogen flow path 31*a*. Hydrogen delivered to the hydrogen flow path 31*a* is introduced into the tank 21 via the hydrogen flow path 31*b*. Hydrogen is delivered from the reservoir 11 to the hydrogen flow path 31*b* at a pressure of greater than or equal to 0.2 MPa and less than 3.0 MPa. Hydrogen thus introduced into the tank 21 is absorbed by the hydrogen storage alloy 22 with which the tank main body is loaded. Absorption of hydrogen by the hydrogen storage alloy 22 continues until the tank 21 is filled with a sufficient amount of hydrogen.

Once the hydrogen filling of the tank 21 is completed, the valve in the hydrogen flow path is closed. In addition, the pump 12*b* is turned off to stop the circulation of the thermal medium for cooling 12*a*. Next, the switching valve 40*a* is switched to connect the thermal medium flow path 32*a* with the thermal medium flow path 34, while the switching valve 40*b* is switched to connect the thermal medium flow path 33*a* with the thermal medium flow path 37. The thermal medium for heating is then delivered from the thermal medium delivery device 14 to the thermal medium flow path 34. The thermal medium for heating delivered to the thermal medium flow path 34 reaches the thermal medium distribution unit 23 via the thermal medium flow path 32*a* and the thermal medium flow path 32*b*. The thermal medium for heating discharges from the thermal medium distribution unit 23 the thermal medium for cooling 12*a* remaining therein, while conducting thermal exchange with the hydrogen storage alloy 22 to heat the hydrogen storage alloy 22. The thermal medium for cooling 12*a* discharged from the thermal medium distribution unit 23 is delivered back to the cooling medium reservoir 12 via the thermal medium flow path 33*b*, the thermal medium flow path 33*a* and the thermal medium flow path 37, together with the thermal medium for heating. Once the hydrogen storage alloy 22 is heated by the thermal medium for heating, delivery of the thermal medium for heating from the thermal medium delivery device 14 is stopped. Finally, the valves in the thermal medium flow paths are closed, and then the connection portion 10 and the connection portion 20 are disconnected.

Other Embodiments

Embodiments disclosed herein should be construed as exemplary and not limiting in all respects. The scope of the present invention is not limited to the configurations of the aforementioned embodiments but rather defined by the Claims, and intended to encompass any modification within the meaning and scope equivalent to those of the Claims.

In the foregoing, the embodiments have been described in which the hydrogen flow path 31*a*, the thermal medium flow path 32*a* and the thermal medium flow path 33*a* are combined at least at the end portion connectable to the vehicle 2; however, the present invention is not limited thereto. For example, the hydrogen flow path 31*a*, the thermal medium flow path 32*a* and the thermal medium flow path 33*a* may be separately formed and individually connected to the vehicle 2.

In the foregoing, the embodiments have been described in which the gas supply system 1 is provided with the thermal medium delivery device 14 that delivers the thermal medium for heating to the thermal medium distribution unit 23 in the vehicle 2; however, the present invention is not limited thereto. For example, the vehicle 2 may be provided with a flow path that distributes to the thermal medium distribution unit 23, the thermal medium having received exhaust heat from the driving device 24.

In the foregoing, the embodiments have been described in which the vehicle 2 is provided with the tank 21 loaded with the hydrogen storage alloy 22. The tank 21 may be in an arbitrary shape, for example a cylindrical shape, a cuboid shape, a pyramidal shape, a prismatic shape, a discoid shape, and the like. Particularly, since the tank 21 loaded with the hydrogen storage alloy 22 is capable of retaining hydrogen at a lower pressure in comparison with a high-pressure hydrogen container that retains hydrogen in a state of high-pressure gas, the tank 21 may be in a shape other than a cylindrical shape and enables implementation of the tank in accordance with a shape of the vehicle body.

In the case in which the vehicle 2 is a cargo vehicle provided with a balance weight, the tank 21 is preferably installed at a position in the vehicle 2 where the balance weight is to be provided. When the vehicle 2 has such a structure, the tank 21 loaded with the hydrogen storage alloy 22 serves as the balance weight, and eventually suppression of the increase in weight or size of the vehicle body is enabled, in comparison with the case of the vehicle 2 having the tank at other position.

In the foregoing, the embodiments have been described in which the reservoir 11 is a tank that reserves hydrogen at a pressure of greater than or equal to 0.2 MPa and less than 3.0 MPa; however, the reservoir 11 may be a tank that retains hydrogen in a gas state, or a tank that is loaded with the hydrogen storage alloy, stores and releases hydrogen.

In the foregoing, the embodiments have been described in which the flow path that supplies hydrogen to the reservoir 11 is connected to the reservoir 11; however, hydrogen may be supplied to the reservoir 11 by an arbitrary supply means. For example, hydrogen derived from renewable energy generated by a water electrolysis device may be supplied to the reservoir 11.

INDUSTRIAL APPLICABILITY

The gas supply system, the vehicle, and the hydrogen supply facility according to the aspects of the present invention enable suppression of the complexity or the increase in size, and supply of hydrogen at the high supply speed.

EXPLANATION OF THE REFERENCE SYMBOLS

1 Gas supply system
2 Vehicle
10 Connection portion
11 Reservoir
12 Cooling medium reservoir
12*a* Thermal medium for cooling
12*b* Pump
12 Heat exchanger
14 Thermal medium delivery device
20 Connection portion
21 Tank
22 Hydrogen storage alloy
23 Thermal medium distribution unit
24 Driving device
24*a* Flow path
31*a*, 31*b* Hydrogen flow path
32*a*, 32*b*, 33*a*, 33*b*, 34, 35, 36, 37 Thermal medium flow path
40*a*, 40*b* Switching valve

The invention claimed is:

1. A gas supply system for use in supplying hydrogen to a vehicle, the vehicle comprising: a tank that is loaded with a hydrogen storage alloy, stores and releases hydrogen; and a thermal medium distribution unit that is attached to the tank and is configured such that a thermal medium for heating for the purpose of heating the hydrogen storage alloy or a thermal medium for cooling for the purpose of cooling the hydrogen storage alloy is distributable from an external space, the gas supply system comprising:
   a reservoir that reserves hydrogen at a pressure of greater than or equal to 0.2 MPa and less than 3.0 MPa;
   a hydrogen flow path that is connectable to the vehicle for supplying hydrogen from the reservoir to the tank in the vehicle at a pressure of greater than or equal to 0.2 MPa and less than 3.0 MPa;
   a cooling medium reservoir that reserves the thermal medium for cooling in a cooled state;
   a thermal medium flow path that is connectable to the vehicle for selectively distributing the thermal medium for heating or the thermal medium for cooling to the thermal medium distribution unit in the vehicle;
   a pump that delivers the thermal medium for heating to the thermal medium distribution unit in the vehicle;
   an other pump that delivers the thermal medium for cooling to the thermal medium distribution unit in the vehicle; and
   a switching valve that allows the thermal medium flow path to selectively connect between the thermal medium for cooling and the thermal medium for heating, wherein
   the hydrogen flow path and the thermal medium flow path are combined at least at an end portion connectable to the vehicle.

2. The gas supply system according to claim 1, further comprising
   a coupler that is connectable to the vehicle in a detachable manner, wherein
   the hydrogen flow path and the thermal medium flow path are combined in the coupler.

3. The gas supply system according to claim 1, wherein the thermal medium for cooling at a temperature of greater than or equal to −40° C. and less than or equal to 0° C. is distributed in the thermal medium distribution unit in the vehicle.

4. The gas supply system according to claim 1, wherein the pump is an air pump.

5. The gas supply system according to claim 4, further comprising
   a coupler that is connectable to the vehicle in a detachable manner, wherein
   the hydrogen flow path and the thermal medium flow path are combined in the coupler.

6. The gas supply system according to claim 4, wherein the thermal medium for cooling at a temperature of greater than or equal to −40° C. and less than or equal to 0° C. is distributed in the thermal medium distribution unit in the vehicle.

* * * * *